No. 891,880. PATENTED JUNE 30, 1908.
T. F. TIMBY.
ANIMAL TRAP.
APPLICATION FILED APR. 16, 1908.
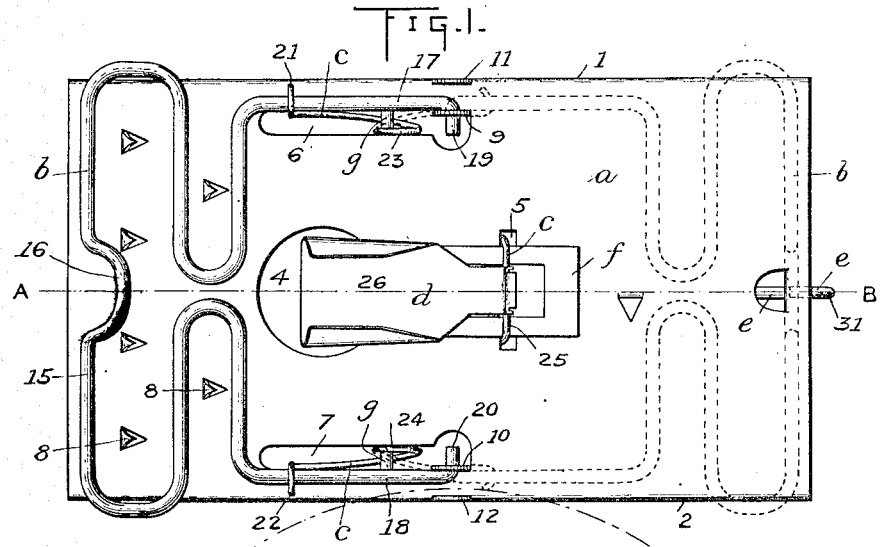
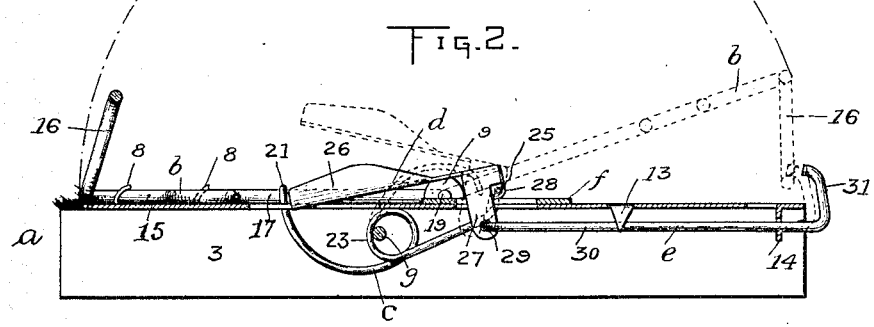
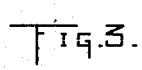
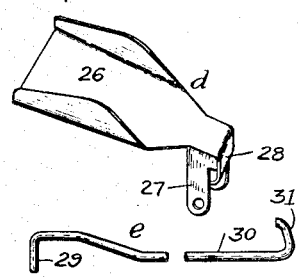
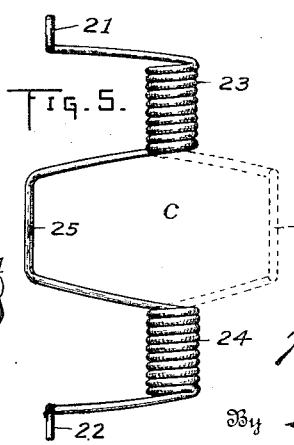
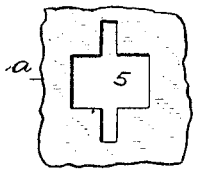
Witnesses
Inventor
Theodore F. Timby
By
Attorney

UNITED STATES PATENT OFFICE.

THEODORE F. TIMBY, OF ALMA, MICHIGAN.

ANIMAL-TRAP.

No. 891,880.     Specification of Letters Patent.     Patented June 30, 1908.

Application filed April 16, 1908. Serial No. 427,341.

*To all whom it may concern:*

Be it known that I, THEODORE F. TIMBY, a citizen of the United States of America, and a resident of Alma, Gratiot county, in the State of Michigan, have invented a new and useful Improvement in Animal - Traps, of which the following is a specification.

This invention relates primarily to that simple form of "impalement" traps in which a striker is hinged to a base and is set by turning the striker on its axis of movement into a reversed position; a suitable spring interacting with the striker to give it its effective movement when the striker is released or tripped.

The present invention consists in certain novel combinations of parts hereinafter set forth and claimed.

The leading object of the invention is to so construct and arrange the parts that the spring is given maximum leverage when the striker is in its normal position of rest, and the leverage is reduced as the striker approaches its set position, so that the strain on the parts when the trap is set, as well as when it is out of use, is reduced to the utmost.

Other objects will be set forth in the general description which follows.

A sheet of drawings accompanies this specification as part thereof.

Figure 1 is a top view with the movable parts shown in full lines in their normal positions of rest, and in dotted lines in the positions which they occupy when the trap is set; Fig. 2 represents a vertical longitudinal section on the line A—B, Fig. 1, showing the parts in full and dotted lines as in Fig. 1; Fig. 3 is a perspective view of the combined trigger and bait holder detached; Fig. 4 is a perspective view of the setting bolt detached; Fig. 5 is a top view of the spring detached, showing its central portion in full lines in the position it assumes when relieved from tension, and in dotted lines in its position represented by full lines in Figs. 1 and 2; Fig. 6 is a fragmentary top view of the base showing a peculiarly shaped hole therein which is partly covered in Fig. 1; and Fig. 7 is a top view of the cover of said hole, detached.

Like reference characters refer to like parts in all the figures.

The improved trap is composed of a base, *a*, a striker, *b*, hinged to the top of said base, a spring, *c*, attached to the base and interacting with said striker, a combined trigger and bait holder, *d*, hereinafter termed the trigger, and a setting bolt, *e*, interacting with said trigger; together with said cover, *f*, of a hole in the base, hereinafter more particularly described.

The base *a*, as shown in the drawings, is made of stiff sheet-metal with longitudinal bends, 1 and 2, by which its lateral edges are turned downward to form sides substantially parallel with each other, one of which sides is shown at 3 in Fig. 2, and provided with openings, 4, 5, 6 and 7, in its top, and with projections, 8, 9, 10, 11, 12, 13 and 14, formed from the metal cut from minor openings in the sheet-metal.

The striker *b* is preferably and conveniently made from stiff wire, in one piece, bent as shown in Figs. 1 and 2 so as to give an extended striking surface, 15, in the form of serpentine bends with reference to which the projections 8 are arranged; these projections being upwardly projecting teeth to prevent the escape of an animal from beneath the striker. Other features of the striker are a central loop, 16, at the free edge of the striker, which projects upwardly in its normal position of rest, a pair of straight side portions 17 and 18 parallel with each other, and terminal trunnions, 19 and 20, which interact with said projections 9 and 10 to form a pair of hinges, and are secured against disengagement by said projections 11 and 12.

The spring *c* is of resilient wire, and before the parts are assembled is of the shape represented in full lines in Fig. 5. It includes a pair of end portions, 21 and 22, adapted to contact with said side portions 17 and 18 of the striker *b*, a pair of coils, 23 and 24, from the outer ends of which said end portions 21 and 22 extend, and a central attaching portion, 25, which is reversed, as represented in dotted lines in Fig. 5, to give the spring its initial tension in attaching the spring, which is done as follows: Said attaching portion 25 of the spring, after having been reversed, is passed upward through the central wider portion of the hole 5 in the top of the base, with the hole uncovered as in Fig. 6, and the flat slotted cover *f*, shown detached by Fig. 7, is then slipped into place beneath said attaching portion, securely attaching the spring but leaving the center of said attaching portion 25 exposed. A piece of stiff wire, g, is passed lengthwise through the coils of the spring c, and attached to the sides 3 of the base a, as an additional support.

The trigger d, shown detached by Fig. 3, is preferably made of sheet metal in the shape represented in the drawings, and is provided by bends with a longitudinally flanged bait holder, 26, as an integral part thereof. Its other features are a downwardly extending crank-arm projection, 27, formed by a pair of lugs at the hinge end of the trigger, and a horizontal sleeve or loop, 28, at its hinge end, to embrace the central transverse portion of said attaching portion 25 of the spring c, upon which it is pivoted or articulated.

The bolt e, shown detached by Fig. 4, consists of a piece of stiff wire bent to form a pivot portion, 29, which interacts with said crank-arm projection 27 of the trigger d, a straight portion, 30, which interacts with said projections 13 and 14, these projections extending downward from the top of the base, and an upwardly bent terminal portion, 31, adapted to interlock with the reversed striker b as in dotted lines in Figs. 1 and 2.

With the parts in their positions of rest represented in full lines in Figs. 1 and 2, a piece of bait is pressed between the baitholder flanges of the trigger d, and the striker b is then turned by a finger applied to its loop 16 into its reversed position, represented in dotted lines in Figs. 1 and 2, and is held in this position by temporarily interlocking the outer end 31 of the bolt e with said loop 16 of the striker, as indicated in dotted lines in Figs. 1 and 2.

When the striker b is at rest, as in full lines in Figs. 1 and 2, the end portions of the spring c contact with said straight side portions 17 and 18 of the striker at a distance from its axis of movement; as the tension of the spring is increased, by turning the striker into its reversed position, the points of contact are shifted nearer to the axis of movement, and the leverage of the spring is thus reduced to the utmost so as to equalize in part its increased tension with reference to the strain on the parts, and particularly the fastenings of the spring. On the other hand, as will be readily understood, when an animal moves the trigger d and releases or trips the striker, the contacts of the spring are shifted in the reverse direction so as to increase its leverage as the striker descends, and thus to insure the most effective stroke.

The base a may be made of wood or other material instead of sheet-metal in some cases, and other like modifications will suggest themselves to those skilled in the art.

Having thus described said improvement, I claim as my invention and desire to patent under this specification:

1. An animal trap having, in combination, a base, a striker hinged to the top of said base, a spring attached to said base and contacting with said striker in the striker's normal position of rest at a distance from the striker's axis of movement and with maximum leverage, the tension of said spring being increased by turning said striker upon said axis, and the contact between said spring and said striker approaching said axis as the striker is turned toward its set position, means for holding the striker in its set position, and means for tripping the holding means to free the striker and spring.

2. An animal trap having, in combination, a base, a striker hinged to the top of said base, a double-ended coiled spring having end portions which contact with said striker and a central portion by which it is attached to said base, said spring being put in tension by reversing said striker on its axis of movement, a setting bolt movable longitudinally beneath said base and interacting with the reversed striker, and a pivoted trigger having a downwardly extending crank-arm projection interacting with said bolt to free the striker and spring.

3. An animal trap having, in combination, a base, a one-part striker hinged to the top of said base and including straight side portions parallel with each other, a double-ended spring the end portions of which extend normally in the same direction as said side portions and contact therewith at a distance from the striker's axis of movement and with maximum leverage in said striker's normal position of rest, said spring having a pair of coils from the outermost ends of which said end portions extend and a central attaching portion, means by which said central portion is attached to the base and partly exposed, a trigger pivoted on said central portion of the spring and having a crank-arm projection, and a bolt interacting with said crank-arm projection at its inner end adapted to interlock with the reversed striker when the trap is set, substantially as hereinbefore specified.

THEODORE F. TIMBY.

Witnesses:
   J. T. SWIGART,
   A. W. BROCK.